(12) United States Patent
Scully et al.

(10) Patent No.: US 11,864,223 B2
(45) Date of Patent: Jan. 2, 2024

(54) METHOD AND APPARATUS FOR IMPLEMENTING A SECURITY VALUE GENERATION MODULE

(71) Applicant: JPMorgan Chase Bank, N.A., New York, NY (US)

(72) Inventors: Alan Scully, Tokyo (JP); Andrew Kilmartin Flynn, Tokyo (JP); Rita Chan, Tokyo (JP); Girish Asrani, Thane (IN); Meng Feng, Singapore (SG)

(73) Assignee: JPMORGAN CHASE BANK, N.A., New York, NY (US)

( * ) Notice: Subject to any disclaimer, the term of this patent is extended or adjusted under 35 U.S.C. 154(b) by 394 days.

(21) Appl. No.: 17/342,855

(22) Filed: Jun. 9, 2021

(65) Prior Publication Data
US 2022/0015106 A1   Jan. 13, 2022

Related U.S. Application Data

(60) Provisional application No. 63/048,802, filed on Jul. 7, 2020.

(51) Int. Cl.
| | |
|---|---|
| *H04W 12/50* | (2021.01) |
| *H04W 28/02* | (2009.01) |
| *H04W 72/53* | (2023.01) |
| *H04W 72/54* | (2023.01) |
| *H04W 72/563* | (2023.01) |
| *H04L 45/02* | (2022.01) |
| *H04W 76/14* | (2018.01) |

(52) U.S. Cl.
CPC ......... *H04W 72/563* (2023.01); *H04L 45/026* (2013.01); *H04W 12/50* (2021.01); *H04W 28/0268* (2013.01); *H04W 72/53* (2023.01); *H04W 72/54* (2023.01); *H04W 76/14* (2018.02)

(58) Field of Classification Search
CPC ............... H04W 72/563; H04W 12/50; H04W 28/0268; H04W 72/53; H04W 72/54; H04W 76/14; H04L 45/026; G06Q 30/08; G06Q 40/04
See application file for complete search history.

(56) References Cited

U.S. PATENT DOCUMENTS

| | | | | |
|---|---|---|---|---|
| 2007/0220146 A1 * | 9/2007 | Suzuki | ................... | H04L 63/105 |
| | | | | 709/225 |
| 2020/0336481 A1 * | 10/2020 | Fan | ........................ | H04L 9/0869 |
| 2021/0051573 A1 * | 2/2021 | Miklös | .................... | H04L 67/51 |

FOREIGN PATENT DOCUMENTS

| | | | | |
|---|---|---|---|---|
| WO | WO-0163499 A1 * | 8/2001 | ............. | G06Q 30/02 |

* cited by examiner

*Primary Examiner* — Ashley Shivers
(74) *Attorney, Agent, or Firm* — GREENBLUM & BERNSTEIN, P.L.C.

(57) ABSTRACT

Various methods, apparatuses/systems, and media for implementing a security value generation module are disclosed. A processor establishes a communication link between a registry and a plurality of service devices each configured to provide corresponding service. A receiver receives a request from a user device for generating a value of a security based on a requested quality level. The processor implements rules to determine which service to be used for generating the value of the security based on the requested quality level in response to the received request; generates the value of the security based on the implemented rules; and transmits an electronic package to the user device, the package including data related to the value of the security.

20 Claims, 6 Drawing Sheets

US 11,864,223 B2

METHOD AND APPARATUS FOR IMPLEMENTING A SECURITY VALUE GENERATION MODULE

CROSS-REFERENCE TO RELATED APPLICATIONS

This application claims the benefit of priority from U.S. Provisional Patent Application No. 63/048,802, filed Jul. 7, 2020, which is herein incorporated by reference in its entirety.

TECHNICAL FIELD

This disclosure generally relates to data processing, and, more particularly, to methods and apparatuses for implementing a security value generation module for determining a value (e.g., financial value, but the disclosure is not limited thereto) of a security based on a requested quality.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

Today, in a trading environment, there is often a need to get a price (or other financial information such as accrued interest, payments, etc.) for a security. Conventionally, there appears to be various methods of obtaining a value of a security, with varying levels of accuracy, cost, reliability, confidence, and quality.

Typically, different use cases may determine what quality of a calculated value a user (e.g., a client) may be willing to accept. For example, an indicative price for a website may use a rough price based on a quick calculation using delayed data, but a price for trading with a client may be calculated on a compute farm using high quality, high confidence data sources to a high accuracy, with a guarantee back to the trader that the price is reliable. Conventional systems appear to face a problem in abstracting the acquisition of the value for the required level of quality, and providing that back to the requester with the associated quality, and explaining the meaning of that quality.

SUMMARY

The present disclosure, through one or more of its various aspects, embodiments, and/or specific features or sub-components, may provide, among others, various systems, servers, devices, methods, media, programs, and platforms for implementing a security value generation module for determining a value (e.g., a financial value, price, accrued interest, payments, etc., but the disclosure is not limited thereto) of a security based on a requested quality, but the disclosure is not limited thereto. The present disclosure, through one or more of its various aspects, embodiments, and/or specific features or sub-components, may also provide, among others, various systems, servers, devices, methods, media, programs, and platforms for implementing a security value generation module which may use rules and artificial intelligence (AI)/machine learning (ML) models to determine how to generate the value from different options, and returns the value, quality level, and traceable explanation to a client device, thereby improving functionality of an adaptive system in a trading environment, but the disclosure is not limited thereto.

According to an aspect of the present disclosure, a method for implementing a security value generation module by utilizing one or more processors and one or more memories is disclosed. The method may include: establishing a communication link between a registry and a plurality of service devices each configured to provide corresponding service; receiving a request from a user device for generating a value of a security based on a requested quality level; implementing rules to determine which service to be used for generating the value of the security based on the requested quality level in response to the received request; generating the value of the security based on the implemented rules; and transmitting an electronic package to the user device, the electronic package including data related to the value of the security.

According to another aspect of the present disclosure, wherein the electronic package may further include data related to a calculated quality level, data related to an explainable trace of the rules used for generating the value of the security, and data related to explanation of the quality level, but the disclosure is not limited thereto.

According to yet another aspect of the present disclosure, wherein establishing a communication link may further include: registering availability of each service with the registry; and maintaining the communication link between the registry and the plurality of service devices via corresponding heartbeat.

According to further aspect of the present disclosure, the method may further include: pre-configuring the registry with an indication of priority for each service; and maintaining a record within the registry corresponding to types of servicers and availability of each service.

According to an additional aspect of the present disclosure, the method may further include: pre-configuring the registry with an indication of priority for each service and availability of each service; maintaining the communication link between the registry and the plurality of service devices via corresponding heartbeat; and updating the registry based on: (i) information received from a service device where the service device self-discloses that it is not reliable or not available to perform its service; or (ii) observation by the registry that there is no active heartbeat between a service device and the registry.

According to yet another aspect of the present disclosure, wherein the rules specify a priority among the properties of the services that corresponds to the requested priority level.

According to an additional aspect of the present disclosure, the method may further include: identifying a service, that is to be used for generating the value of the security based on the requested quality level, as a first order priority service in response to the received request; confirming whether or not the service identified as the first order priority service is available; and transmitting the received request to the first order priority service when it is confirmed that the service identified as the first order priority service is available.

According to a further aspect of the present disclosure, wherein, when it is confirmed that the service identified as the first order priority service is not available, the method may further include: identifying another service, that is to be used for generating the value of the security based on the requested quality level, as a second order priority service in response to the received request; confirming whether or not the service identified as the second order priority service is available; and transmitting the received request to the second order priority service when it is confirmed that the service identified as the second order priority service is available.

According to an additional aspect of the present disclosure, wherein, when all service options have expired and none are available, the method may further include: constructing a quality of response message indicating appropriate error condition; and transmitting the message to the user device.

According to yet another aspect of the present disclosure, a system for implementing a security value generation module is disclosed. The system may include a registry (i.e., a database) including memories and a processor operatively connected to the registry via a communication network. The processor may be configured to: establish a communication link between a registry and a plurality of service devices each configured to provide corresponding service; receive a request from a user device for generating a value of a security based on a requested quality level; implement rules to determine which service to be used for generating the value of the security based on the requested quality level in response to the received request; generate the value of the security based on the implemented rules; and transmit an electronic package to the user device, the electronic package including data related to the value of the security.

According to another aspect of the present disclosure, in establishing a communication link, the processor may be further configured to: register availability of each service with the registry; and maintain the communication link between the registry and the plurality of service devices via corresponding heartbeat.

According to further aspect of the present disclosure, the processor may be further configured to: pre-configure the registry with an indication of priority for each service; and maintain a record within the registry corresponding to types of servicers and availability of each service.

According to an additional aspect of the present disclosure, the processor may be further configured to: pre-configure the registry with an indication of priority for each service and availability of each service; maintain the communication link between the registry and the plurality of service devices via corresponding heartbeat; and update the registry based on: (i) information received from a service device where the service device self-discloses that it is not reliable or not available to perform its service; or (ii) observation by the registry that there is no active heartbeat between a service device and the registry.

According to an additional aspect of the present disclosure, the processor may be further configured to: identify a service, that is to be used for generating the value of the security based on the requested quality level, as a first order priority service in response to the received request; confirm whether or not the service identified as the first order priority service is available; and transmit the received request to the first order priority service when it is confirmed that the service identified as the first order priority service is available.

According to a further aspect of the present disclosure, wherein, when it is confirmed that the service identified as the first order priority service is not available, the processor may be further configured to: identify another service, that is to be used for generating the value of the security based on the requested quality level, as a second order priority service in response to the received request; confirm whether or not the service identified as the second order priority service is available; and transmit the received request to the second order priority service when it is confirmed that the service identified as the second order priority service is available.

According to an additional aspect of the present disclosure, wherein, when all service options have expired and none are available, the processor may be further configured to: construct a quality of response message indicating appropriate error condition; and transmit the message to the user device.

According to a further aspect of the present disclosure, a non-transitory computer readable medium configured to store instructions for implementing a security value generation module is disclosed. The instructions, when executed, may cause a processor to perform the following: establishing a communication link between a registry and a plurality of service devices each configured to provide corresponding service; receiving a request from a user device for generating a value of a security based on a requested quality level; implementing rules to determine which service to be used for generating the value of the security based on the requested quality level in response to the received request; generating the value of the security based on the implemented rules; and transmitting a package to the user device, the package including data related to the value of the security.

According to yet another aspect of the present disclosure, in establishing a communication link, the instructions, when executed, may further cause the processor to perform the following: registering availability of each service with the registry; and maintaining the communication link between the registry and the plurality of service devices via corresponding heartbeat.

According to further aspect of the present disclosure, the instructions, when executed, may further cause the processor to perform the following: pre-configuring the registry with an indication of priority for each service; and maintaining a record within the registry corresponding to types of servicers and availability of each service.

According to an additional aspect of the present disclosure, the instructions, when executed, may further cause the processor to perform the following: pre-configuring the registry with an indication of priority for each service and availability of each service; maintaining the communication link between the registry and the plurality of service devices via corresponding heartbeat; and updating the registry based on: (i) information received from a service device where the service device self-discloses that it is not reliable or not available to perform its service; or (ii) observation by the registry that there is no active heartbeat between a service device and the registry.

According to an additional aspect of the present disclosure, the instructions, when executed, may further cause the processor to perform the following: identifying a service, that is to be used for generating the value of the security based on the requested quality level, as a first order priority service in response to the received request; confirming whether or not the service identified as the first order priority service is available; and transmitting the received request to the first order priority service when it is confirmed that the service identified as the first order priority service is available.

According to a further aspect of the present disclosure, wherein, when it is confirmed that the service identified as the first order priority service is not available, the instructions, when executed, may further cause the processor to perform the following: identifying another service, that is to be used for generating the value of the security based on the requested quality level, as a second order priority service in response to the received request; confirming whether or not the service identified as the second order priority service is available; and transmitting the received request to the second order priority service when it is confirmed that the service identified as the second order priority service is available.

According to an additional aspect of the present disclosure, wherein, when all service options have expired and none are available, the instructions, when executed, may further cause the processor to perform the following: constructing a quality of response message indicating appropriate error condition; and transmitting the message to the user device.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Figure 1:
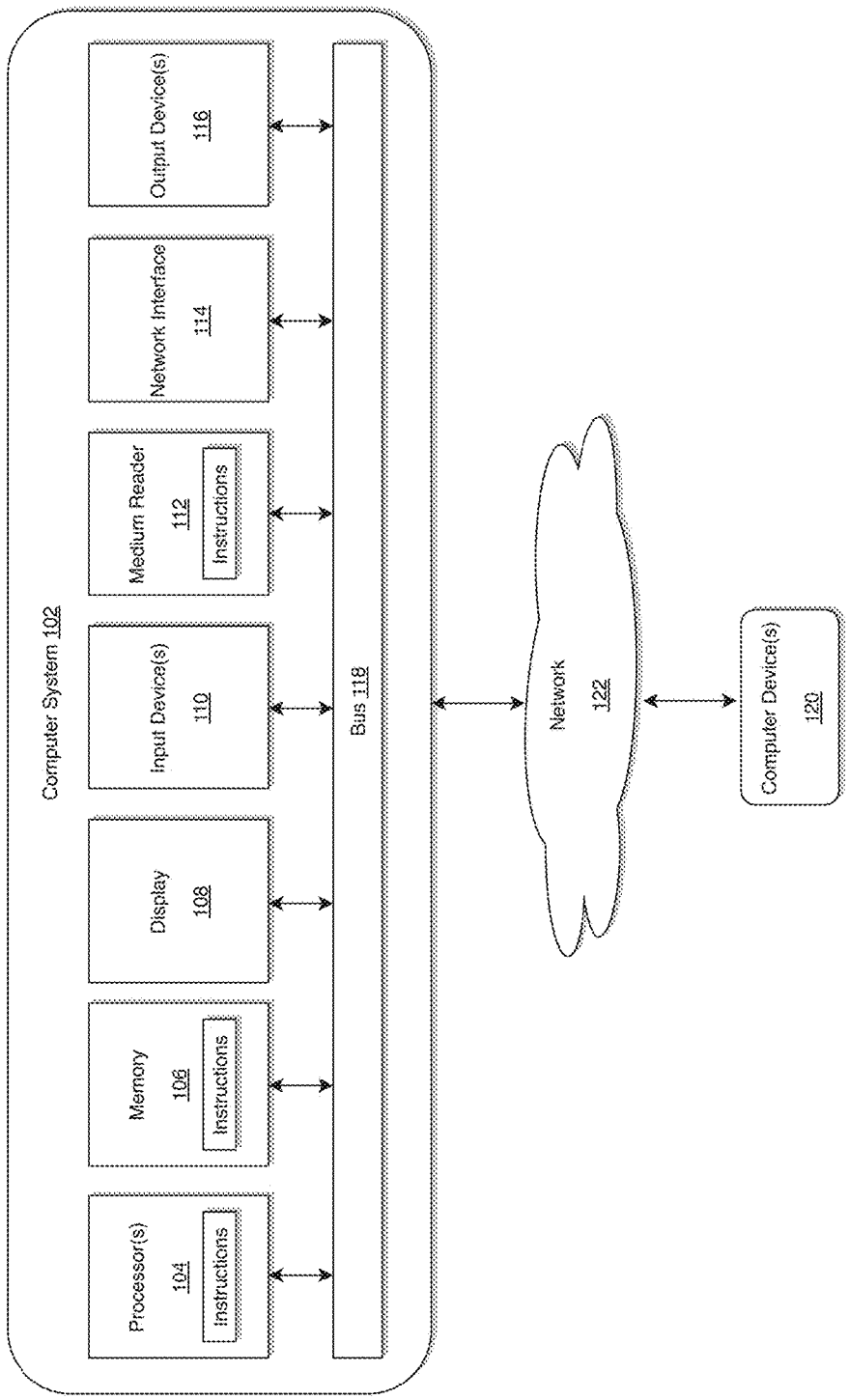
FIG. 1 illustrates a computer system for implementing a security value generation module in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units, engines, tools, devices and/or modules. Those skilled in the art will appreciate that these blocks, units, engines, tools, devices, and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units, engines, tools, devices, and/or modules being implemented by microprocessors or similar, they may be programmed using software (e.g., microcode) to perform various functions discussed herein and may optionally be driven by firmware and/or software. Alternatively, each block, unit, engine, tool device, and/or module may be implemented by dedicated hardware, or as a combination of dedicated hardware to perform some functions and a processor (e.g., one or more programmed microprocessors and associated circuitry) to perform other functions. Also, each block, unit, engine, tool, device, and/or module of the example embodiments may be physically separated into two or more interacting and discrete blocks, units, engines, tools, devices, and/or modules without departing from the scope of the inventive concepts. Further, the blocks, units, engines, tools, devices, and/or modules of the example embodiments may be physically combined into more complex blocks, units, engines, tools, devices, and/or modules without departing from the scope of the present disclosure.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (CPU), or both. Additionally; any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the terra "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory; electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (OPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

As described herein, various embodiments provide optimized processes of implementing a security value generation module for determining a value (e.g., a financial value, price, accrued interest, etc., but the disclosure is not limited thereto) of a security based on a requested quality, but the disclosure is not limited thereto.

Figure 2:
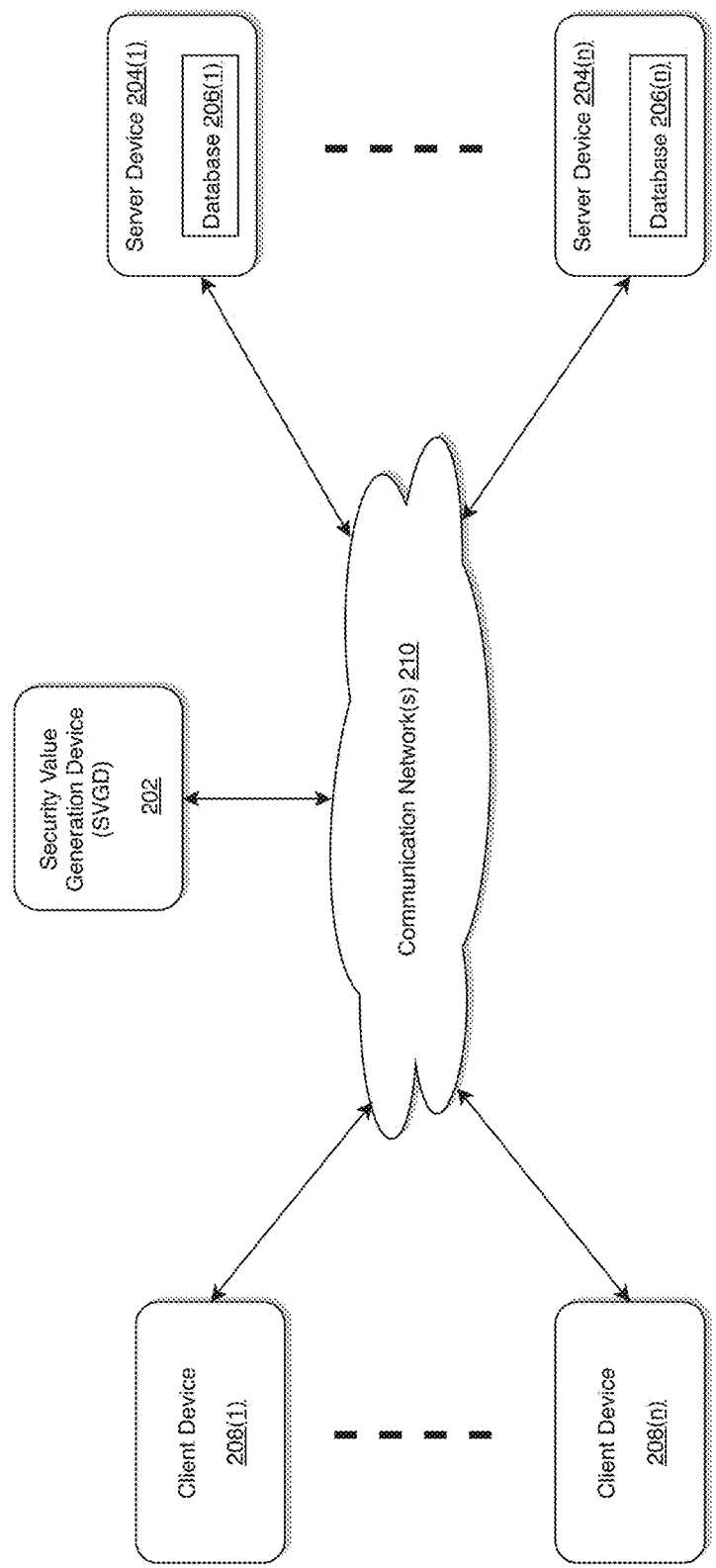
FIG. 2 illustrates an exemplary network diagram of a security value generation device in accordance with an exemplary embodiment.

Referring to FIG. 2, a schematic of an exemplary network environment 200 for implementing a security value generation device (SVGD) of the instant disclosure is illustrated.

Conventional system, that does not implement an SVGD of the instant disclosure, may not be able to provide feedback data regarding implementing a new feature into a current application.

According to exemplary embodiments, the above-described problems associated with conventional system may be overcome by implementing an SVGD 202 having a UI modernization application module as illustrated in FIG. 2 to obtain feedback data regarding implementing a new feature into a current application based on several key data, including but not limited thereto, current technology stack data, current ADA implementation data, current team skills set data, time estimate data on conversion of the application and components, and team size data, thereby improving functionality of a current application, but the disclosure is not limited thereto.

The SVGD 202 may be the same or similar to the computer system 102 as described with respect to FIG. 1.

The SVGD 202 may store one or more applications that can include executable instructions that, when executed by the SVGD 202, cause the SVGD 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the SVGD 202 itself, may be located in virtual server(s) running in a cloud-based computing environment rather than being tied to one or more specific physical network computing devices. Also, the application(s) may be running in one or more virtual machines (VMs) executing on the SVGD 202. Additionally, in one or more embodiments of this technology, virtual machine(s) running on the SVGD 202 may be managed or supervised by a hypervisor.

In the network environment 200 of FIG. 2, the SVGD 202 is coupled to a plurality of server devices 204(1)-204(n) that hosts a plurality of databases 206(1)-206(n), and also to a plurality of client devices 208(1)-208(n) via communication network(s) 210. A communication interface of the SVGD 202, such as the network interface 114 of the computer system 102 of FIG. 1, operatively couples and communicates between the SVGD 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the SVGD 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication nets networks may be used. The communication network(s) 202 in this example may employ any suitable interface mechanisms and network communication technologies including, for example, teletraffic in any suitable form (e.g., voice, modem, and the like), Public Switched Telephone Network (PSTN), Ethernet-based Packet Data Networks (PDNs), combinations thereof, and the like.

The SVGD 202 may be a standalone device or integrated with one or more other devices or apparatuses, such as one or more of the server devices 204(1)-204(n), for example. In one particular example, the SVGD 202 may be hosted by one of the server devices 204(1)-204(n), and other arrangements are also possible. Moreover, one or more of the devices of the SVGD 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the SVGD 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206

(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the SVGD 202 that may be configured for automatically collating data from multiple different source systems into one self-service dashboard, thereby significantly improving release management process and reducing release time, but the disclosure is not limited thereto.

Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example.

The client devices 208(1)-208(n) may run interface applications, such as standard web browsers or standalone client applications, which may provide an interface to communicate with the SVGD 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the SVGD 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the SVGD 202, the server devices 204(1)-204(n), or the client devices 208(1)-208(n), for example, may be configured to operate as virtual instances on the same physical machine. For example, one or more of the SVGD 202, the server devices 204(1)-204(n), or the client devices 208(1)-208(n) may operate on the same physical device rather than as separate devices communicating through communication network(s) 210. Additionally, there may be more or fewer SVGD s 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
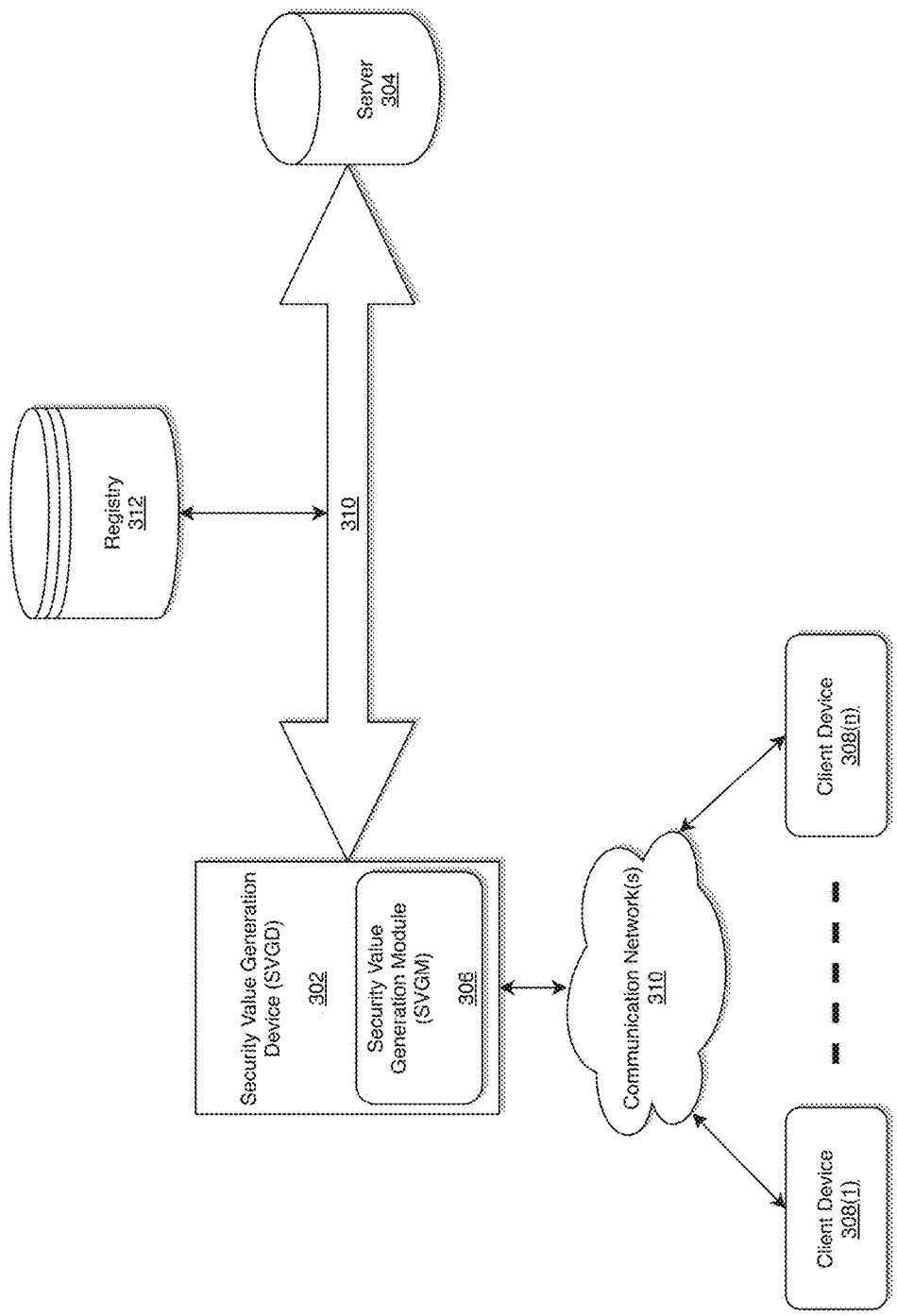
FIG. 3 illustrates a system diagram for implementing a security value generation device with a security value generation module in accordance with an exemplary embodiment.

FIG. 3 illustrates a system diagram for implementing an SVGD with a security value generation module (SVGM) in accordance with an exemplary embodiment.

As illustrated in FIG. 3, in the system 300, according to exemplary embodiments, the SVGD 302 including the SVGM 306 may be connected to a server 304 and a registry (i.e., a database) 312 via a communication network 310, but the disclosure is not limited thereto. For example, according to exemplary embodiments, the SVGM 306 may be connected to any desired database besides the registry 312.

According to exemplary embodiments, the registry 312 may include memories that may store data and metadata related to various services and their priorities and availabilities, rules/logics, AI/ML models, etc., but the disclosure is not limited thereto.

According to exemplary embodiments, the SVGM 306 may be configured to be performed as an adaptive system for determining a financial value of a security based on a requested quality, which uses rules/logics and intelligence (i.e., AI/ML models) to determine how to generate the value from different options, and returns the value, quality level an traceable explanation, but the disclosure is not limited thereto. For example, while the SVGM 306 may preconfigure priority for each service, the priority each service can deliver may vary over time. For example, if a calculation service requires low latency market data and doesn't have access to that, the service may send a message back (e.g., in heartbeat) to state the current priority it can calculate. In another example, the SVGM 306 itself may detect, using rules or AI, conditions such as unreliable network, fast moving markets, volatility in news etc., and may downgrade the priority of certain services, or mark availability as down etc. According to exemplary embodiments, the SVGM 306 may be configured to detect changing state and conditions and adapt to that changing state and conditions to determine requested/desired quality level at a point in time.

According to exemplary embodiment, the SVGD 302 is described and shown in FIG. 3 as including the SVGM 306, although it may include other rules, policies, modules, databases, or applications, for example. According to exemplary embodiments, the registry 312 may be embedded within the SVGD 302. According to exemplary embodiments, the server 304 may also be a database which may be configured to store information including the metadata, but the disclosure is not limited thereto. According to exemplary embodiments, the SVGM 306 may also be referred to as a processor.

According to exemplary embodiments, the SVGM 306 may be configured to receive continuous teed of data from the server 304 and the registry 312 via the communication network 310. According to exemplary embodiments, the SVGM 306 may also be configured to communicate with the client devices 308(1)-308(n) (e.g., user's devices) via the communication network 310, but the disclosure is not limited thereto. According to exemplary embodiments, the client devices 308(1)-308(n) may also be referred to as buyer systems and/or supplier systems.

According to exemplary embodiments, artificial intelligence/Machine learning (AI/ML) models may be trained using CPUs and CPUs to infer decision based on received inputs as described with respect to FIGS. 5A, 5B, and 6 below, but the disclosure is not limited thereto.

As will be described below, the SVGM 306 may be configured to establish a communication link between a registry and a plurality of service devices each configured to provide corresponding service; receive a request from a user device for generating a value of a security based on a requested quality level; implement rules/logics to determine which service to be used for generating the value of the security based on the requested quality level in response to the received request; generate the value of the security based on the implemented rules; and transmit an electronic package to the user device, the electronic package including data related to the value of the security, but the disclosure is not limited thereto.

According to exemplary embodiments, the server 304 may be the same or equivalent to the server device 204 as illustrated in FIG. 2.

The process may be executed via the communication network 310, which may comprise plural networks as described above. For example, in an exemplary embodiment, one or more of the client devices 308(1)-308(n) may communicate with the SVGD 302 via broadband or cellular communication. Of course, these embodiments are merely exemplary and are not limiting or exhaustive.

Figure 4:
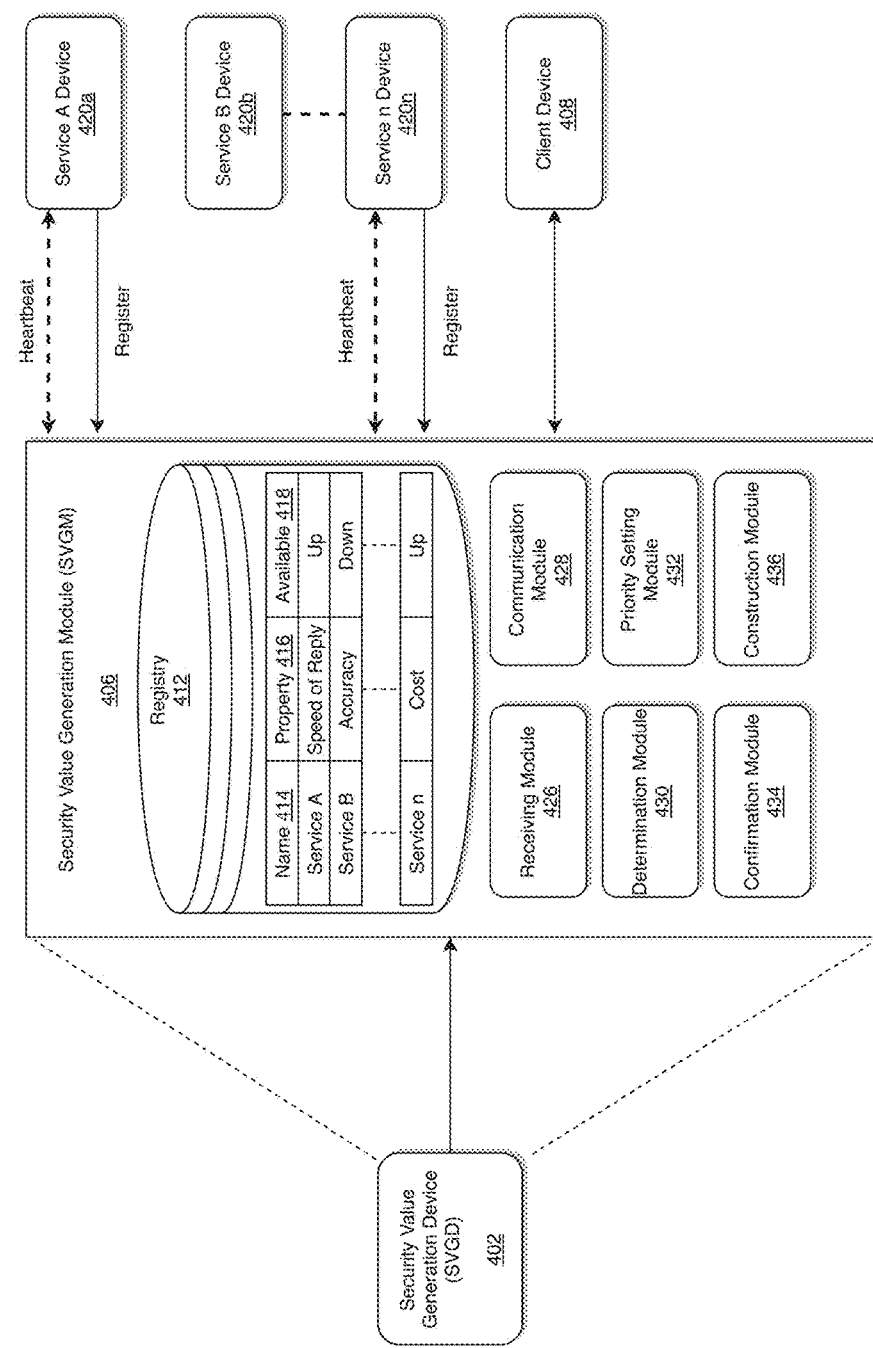
FIG. 4 illustrates a system diagram for implementing a security value generation module of FIG. 3 in accordance with an exemplary embodiment.

FIG. 4 illustrates a system diagram for implementing a security value generation module (SVGM) of FIG. 3 in accordance with an exemplary embodiment. As illustrated in FIG. 4, the system 400 may include an SVGD 402 within which an SVGM 406 may be embedded, a database (not shown), a server (not shown), and a communication network (not shown).

According to exemplary embodiments, as illustrated in FIG. 4, the SVGM 406 may include a registry 412, a receiving module 426, a communication module 428, a determination module 430, a priority setting module 432, a confirmation module 434, and a construction module 436. Although FIG. 4 illustrates that the registry 412 is embedded within the SVGM 406, the registry 412 may also be located external to the SVGM 406 or the SVGD 402.

According to exemplary embodiments, the registry 412 may be same or similar to the registry 312 as illustrated in FIG. 3. Further, the server (not shown) with reference to FIG. 4 may be same or similar to the server 304 as illustrated in FIG. 3, and the communication network (not shown) with reference to FIG. 4 may be same or similar to the communication network 310 as illustrated in FIG. 3.

According to exemplary embodiments, the SVGM 406 may include various systems that are managed and operated by an organization by utilizing user's devices (i.e., client device 408 shown in FIG. 4).

Referring to FIGS. 3 and 4, the process may be executed via the communication network 310 which may comprise plural networks as described above. For example, in an exemplary embodiment, the various components of the SVGM 406 may communicate with the registry 412 and the server 304 via the communication module 428 and the communication network 310. Of course, these embodiments are merely exemplary and are not limiting or exhaustive.

Referring to FIGS. 3 and 4, a plurality of service devices 420a-420n and a client device 408 may be configured to be connected to the SVGM 406 via the communication module 428 and the communication network 310. Although FIG. 4 illustrates one client device 408, the disclosure is not limited thereto. For example, according to exemplary embodiments as illustrated in FIG. 4, a plurality of client devices 408 may be connected to the SVGM 406 as in FIG. 3 (see FIG. 3, a plurality of client devices 308(1)-308(n) are connected to the SVGM 306 via the communication network 310).

According to exemplary embodiments, each of the receiving module 426, the communication module 428, the determination module 430, the priority setting module 432, the confirmation module 434, and the construction module 436 may be implemented by microprocessors or similar, they may be programmed using software (e.g., microcode) to perform various functions discussed herein. Alternatively, each of the receiving module 426, the communication module 428, the determination module 430, the priority setting module 432, the confirmation module 434, and the construction module 436 may be implemented by dedicated hardware, or as a combination of dedicated hardware to perform some functions and a processor (e.g., one or more programmed microprocessors and associated circuitry) to perform various functions discussed herein as well as other functions. Also, according to exemplary embodiments, each of the receiving module 426, the communication module 428, the determination module 430, the priority setting module 432, the confirmation module 434, and the construction module 436 may be physically separated into two or more interacting and discrete blocks, units, engines, devices, and/or modules without departing from the scope of the inventive concepts.

Referring to FIGS. 3 and 4, according to exemplary embodiments, the communication module 428 may establish a link between the SVGM 406 and the registry 412 and the server 304 via the communication network 310. According to exemplary embodiments, the registry 412 may include memories that may store data and metadata related to various services (i.e., Service A, Service B, . . . and Service n) and their priorities and availabilities, rules/logics, AI/ML models, etc., but the disclosure is not limited thereto. According to exemplary embodiments, the registry 412 may include a table having three columns, but the disclosure is not limited thereto: a name column 414, a property column 416, and an available column 418.

According to exemplary embodiments, each service devices 420a-420n may register itself with the registry 412 and maintain a connection with the registry 412 via a communication line (i.e., heartbeat).

According to exemplary embodiments, the SVGM 406 may be configured to be performed as an adaptive system for determining a financial value of a security based on a requested quality, which uses rules/logics and intelligence (i.e., AI/ML models) to determine how to generate the value from different options, and returns the value, quality level an traceable explanation, but the disclosure is not limited thereto.

The receiving module 426 may be configured to access the registry 412 via the communication module 428 and the communication network 310.

According to exemplary embodiments, the communication module 428 may be configured to establish a communication link between the registry 412 and the plurality of service devices 420a-420n and a communication link between the client device 408 and the SVGM 406.

According to exemplary embodiments, service A device 420a may be configured to provide service A, service B device 420b may be configured to provide service B, and service n device 420n may be configured to provide service n, but the disclosure is not limited thereto.

According to exemplary embodiments, the receiving module 426 may be configured to receive a request from the client device 408 (e.g., a user device) for generating a value of a security based on a requested quality level. According to exemplary embodiments, the requested value is not limited the security. For example, any other financial valuation may be received from a user.

According to exemplary embodiments, the determination module 430 may be configured to implement rules to determine which service to be used for generating the value of the security based on the requested quality level in response to the request received from the receiving module 426.

According to exemplary embodiments, the construction module 436 may be configured to generate the value of the security based on the rules implemented by the determination module 430 and construct an electronic package. According to exemplary embodiments, the electronic package may include data related to the value of the security, data related to a calculated quality level, data related to an explainable trace of the rules used for generating the value of the security, and data related to explanation of the quality level, but the disclosure is not limited thereto.

According to exemplary embodiments, the communication module 428 may be configured to transmit the electronic package to the client device 408.

According to exemplary embodiments, the step of establishing a communication link may include registering availability of each service (i.e., service A, service B, . . . service n) with the registry 412 and maintaining the communication link between the registry 412 and the plurality of service devices 420a-420n via corresponding heartbeat.

According to exemplary embodiments, the SVGM 406 may be configured to pre-configure the registry 412 with an indication of priority for each service as illustrated in the table within the registry 412; and maintain a record within the registry 412 corresponding to types of servicers and availability of each service. For example, according to the exemplary embodiments as illustrated in FIG. 4, under the name column 414, service A from service A device 420a is recorded and stored, service B from service B device 420b is recorded and stored, . . . and service n from service n device 420n is recorded and stored, but the disclosure is not limited thereto.

According to the exemplary embodiments as illustrated in FIG. 4, under the property column 416, speed of reply is set to be a priority for service A, accuracy is set to be a priority for service B, and cost is set to be a priority for service n, but the disclosure is not limited thereto. The SVGM 406 may be configured to rearrange priorities according to received request and service availability and the registry 412 may be configured to update and maintain priority information in real time.

According to exemplary embodiments as illustrated in FIG. 4, the SVGM 406 may be configured to pre-configure the registry 412 with an indication of priority for each service and availability of each service and maintain the communication link between the registry 412 and the plurality of service devices 420a-420n via corresponding heartbeat. According to exemplary embodiments, the registry 412 may be configured to determine that a service is not available based on: (i) information received from a service device (i.e., one or more of the service devices 420a-420n) where the service device (i.e., one or more of the service devices 420a-420n) self-discloses that it is not reliable or not available to perform its service; or (ii) observation by the registry 412 that there is no active heartbeat between a service device (i.e., one or more of the service devices 420a-420n) and the registry 412. Thus, the SVGM 406 may be configured to update the registry 412 based on either information received from a service device (i.e., one or more of the service devices 420a-420n) where the service device (i.e., one or more of the service devices 420a-420n) self-discloses that it is not reliable or not available to perform its service; or based on observation by the registry 412 that there is no active heartbeat between a service device (i.e., one or more of the service devices 420a-420n) and the registry 412.

According to the exemplary embodiments as illustrated in FIG. 4, under the available column 418, the registry 412 recorded that service A is currently available (up), service B is currently not available (down), and service n is currently available (up), but the disclosure is not limited thereto. The registry 412 may be configured to update and maintain availability information in real time.

According to exemplary embodiments, the priority setting module 432 may be configured to utilize rules to specify a priority among the properties of the services that corresponds to the requested priority level requested by the client device 408.

According to exemplary embodiments, the determination module 430 may be configured to identify a service that is to be used for generating the value of the security based on the requested quality level requested by the client device 408, as a first order priority service in response to the request received by the receiving module.

According to exemplary embodiments, the confirmation module 434 may be configured to confirm whether or not the service identified as the first order priority service by the determination module 430 is available. The communication module 428 may be configured to transmit the received request to the first order priority service when it is confirmed by the confirmation module 434 that the service identified as the first order priority service is available.

According to exemplary embodiments, when it is confirmed by the confirmation module 434 that the service identified as the first order priority service is not available, the determination module 430 may be configured to identify another service, that is to be used for generating the value of the security based on the requested quality level, as a second order priority service in response to the request received by the receiving module 426. According to exemplary embodiments, the confirmation module 434 may be configured to confirm whether or not the service identified as the second order priority service by the determination module 430 is available. According to exemplary embodiments, the communication module 436 may be configured to transmit the received request to the second order priority service when it is confirmed by the confirmation module 434 that the service identified as the second order priority service is available.

For example, according to exemplary embodiments, a client using the client device 408 may request that the SVGM 406 returns the result with the highest accuracy as being the first order priority and speed as being the second order priority. However, the SVGM 406 may return based on the second order of priority (i.e., speed) because looking at the registry 412, the SVGM 406 determined that service B is considered most accurate, but service B is currently unavailable. Service A is considered the fastest, and is available. Thus, in this example, service A would be queried by the SVGM 406 for data and determining value of the requested security.

According to exemplary embodiments, when the determination module 430 determines that all service options have expired and none are available, the construction module 436 may be configured to construct a quality of response message indicating appropriate error condition; and the communication module 436 may be configured to transmit the message to the client device 408.

According to exemplary embodiments, the SVGM 406 may be configured to make decisions to achieve the requested accuracy using one or more of the following factors, but the disclosure is not limited thereto. For example, the factors may include: known quality of the data source (delayed vs real time); known quality of the calculation methods; detected quality of the data source (e.g., by comparing several data sources, the SVGM 406 may determine that one currently has an issue in terms of accuracy or latency, and therefore, exclude it from certain types of calculation); detected volatility in the market (e.g., a delayed price may be acceptable in low volatility, but unacceptable in high volatility even for a rough calculation); knowledge of which markets are most active; cost of different data sources (e.g., licensing cost); licenses of the requesting user; cost of different calculation methods (e.g., use of a cloud server farm vs a single machine); accuracy of calculation method (e.g., use of a cloud server farm vs rough calculation based on interpolated values); duration of calculation methods; availability and health of different calculation engines; availability and health of different resources (e.g., is compute farm available?); preference for calculation method (e.g., industry preference); queried health values from calculation servers, etc., but the disclosure is not limited thereto.

According to exemplary embodiments, the detected quality by SVGM 406 may be logic coded in the SVGM 406 or AI detection.

According to exemplary embodiments, resultant quality by the SVGM 406 may give an indication of how the returned price compares with the quality requested.

According to exemplary embodiments, traceable explanation generated by the SVGM 406 may indicate the method used to calculate the value and an explanation of that resultant quality. For example, if a high value was requested by the client device 408, but a low quality value was returned by the construction module 436, the SVGM 406 may explain using, for example, "Real time data source detected to be unreliable. Value calculated using delayed data."

According to exemplary embodiments, requests can come from different sources such as an application GUI, chat bot, etc. Exemplary chat bots are illustrated with reference to FIGS. 5A and 5B. For example, FIG. 5A illustrates an exemplary use case of a chat bot by utilizing SVGM 406 in accordance with an exemplary embodiment and FIG. 5B illustrates another exemplary use case of a chat hot by utilizing SVGM 406 in accordance with an exemplary embodiment.

Figure 5A:
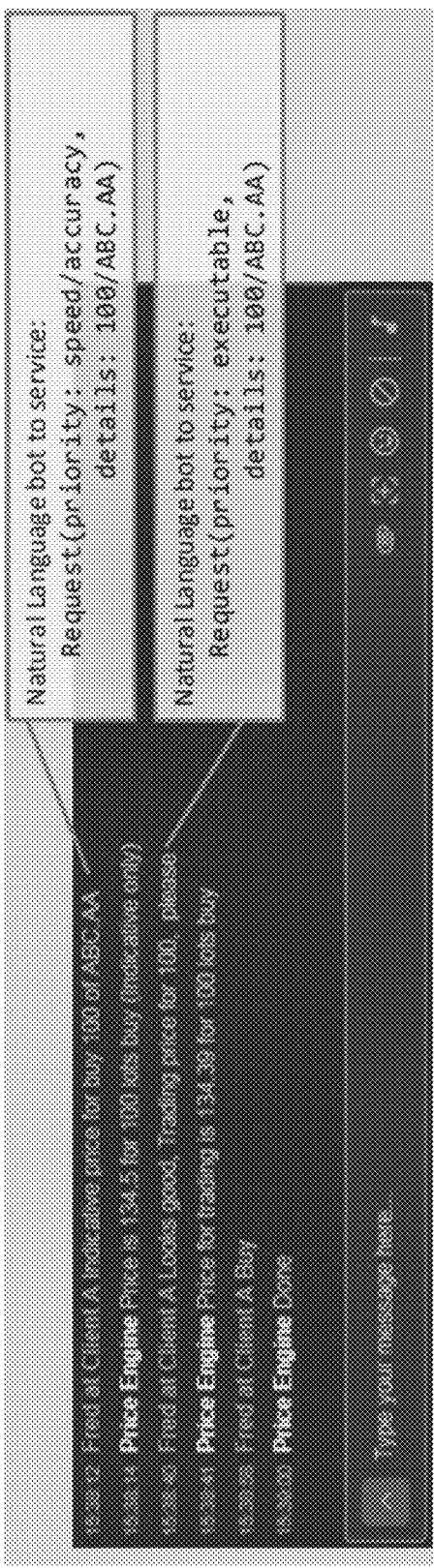
FIG. 5A illustrates an exemplary use case by utilizing a security value generation module in accordance with an exemplary embodiment.
Figure 5B:
FIG. 5B illustrates another exemplary use case by utilizing a security value generation nodule in accordance with an exemplary embodiment.

According to exemplary embodiments, possible use cases may include: natural language price discovery and execution chat bot for clients; application API for integrating into server processes; integrated into a website which displays prices on webpages—prices could be indicative or for trading; sales/trading application which displays prices in GUI for execution (see, e.g., FIG. 5A).

According to exemplary embodiments, possible use cases may also include post trade contract calculation and confirmation process which requires high accuracy. The example illustrated in FIG. 5B describes the sort of calculation as executed via a chat hot. In this exemplary embodiment, the user has executed a securities transaction for a 200 mm of a bond (DE0001135432), traded on a price of 40.8311, with a settlement date of April 9th. The response the SVGM 406 is configured to respond contains the post trade values of Principle, Accrued Interest, and Settlement Amount for the trade. According to exemplary embodiments, this sort of calculation may also be integrated into desktop trading applications.

According to exemplary embodiments, calculation engines of the SVGM 406 may plugin to the calculation engine or remote services, etc.

Conventionally, when a system needs a value to be calculated, it may either implement its own logic to calculate it, or it may know a single source (or perhaps primary+backup) to request the value. That results in hard coded logic in that system, less fault tolerance, less reusability, etc. Such conventional systems also may not provide explanations and confidence levels in the calculation.

According to exemplary embodiments, the SVGM 406 may be configured to abstract out the logic to a service which other systems can use; adapt to different quality levels of request and adjust to different quality levels of calculation engines and data sources using rules and intelligence; and can explain the logic used to the requester.

According to exemplary embodiments, after generating the value (e.g., price) back to the requester (client device 408) with the quality and explanation, the SVGM 406 is configured in such that the requester can give feedback to the SVGM 406 on the result. For example, the requestor may have the opportunity to give high level overall feedback (e.g., agree with quality, disagree with quality) and/or granular feedback (calculated price inaccurate, wrong model used, etc.) which the SVGM 406 may utilize over time to refine choices and generate/update AWL models. The SVGM 406, according to exemplary embodiments, may also be configured to utilize the feedback to modify future behavior (e.g., the SVGM 406 might generate a message to requestor or to all requestors not to use a particular algorithm again). According to exemplary embodiments, feedback may also be aggregated into reporting.

Figure 6:
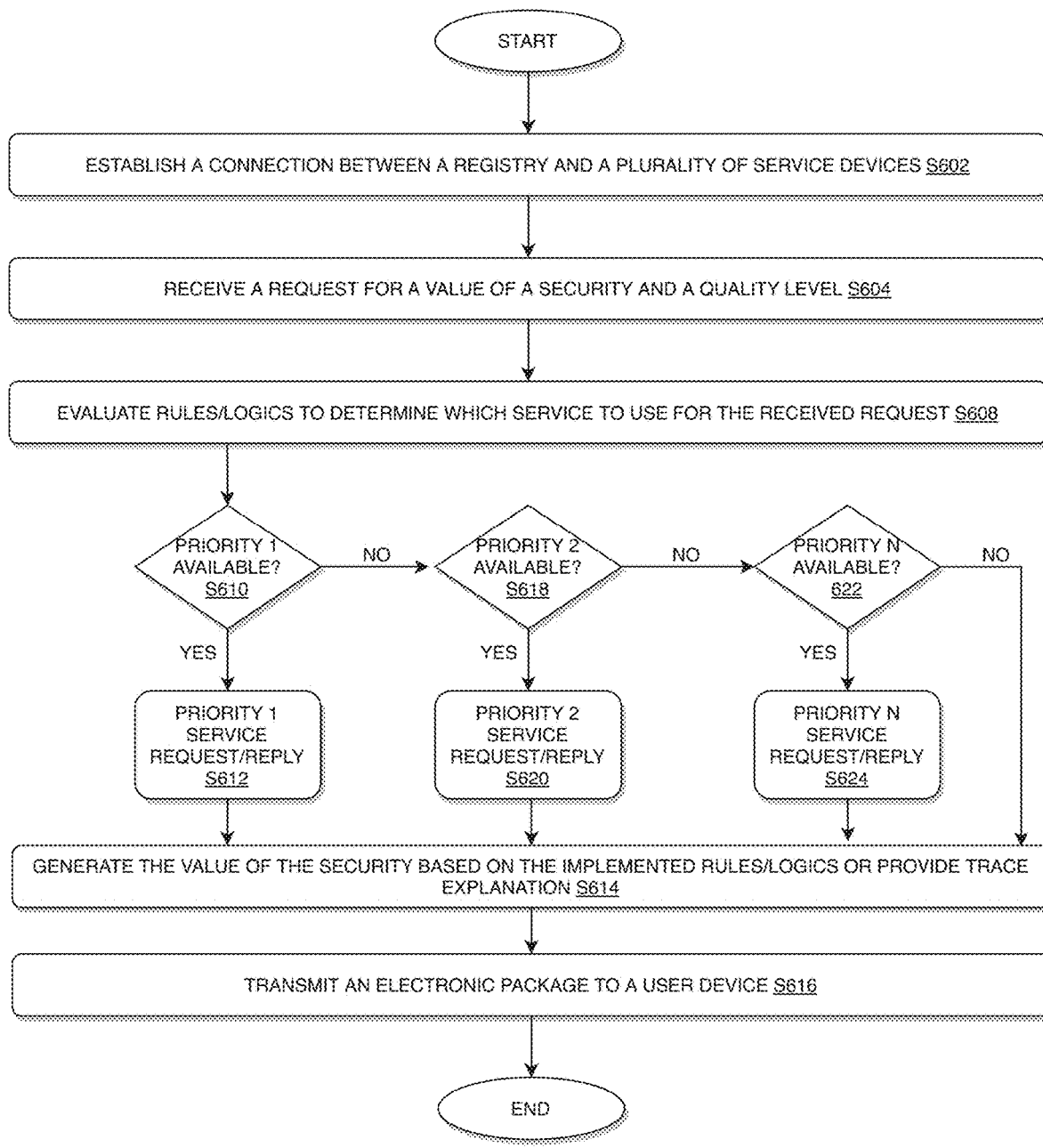
FIG. 6 illustrates a flow chart for implementing a security value generation module in accordance with an exemplary embodiment.

FIG. 6 illustrates a flow chart for implementing a security value generation module in accordance with an exemplary embodiment.

It will be appreciated that the illustrated process 600 and associated steps may be performed in a different order, with illustrated steps omitted, with additional steps added, or with a combination of reordered, combined, omitted, or additional steps.

In the process 600 of FIG. 6, at step S602, a connection may be established between a registry and a plurality of service devices each configured to provide corresponding service. The connection may be a communication link between the registry and the plurality of service devices. At step S604, a request may be received from a user device for generating a value of a security based on a requested quality level. According to exemplary embodiments, the requested value is not limited to a security. For example, any other financial valuation may be received from a user.

According to exemplary embodiments, at step S608, rules/logics may be evaluated to determine which service to be used for generating the value of the security based on the requested quality level in response to the received request.

According to exemplary embodiments, at step S610, it may be determined whether priority 1 is available or not. According to exemplary embodiments, at step S612, priority 1 service is selected, and at step S614, the value of the security may be generated based on the implemented rules or a trace explanation may be provided when it is determined at step S610 that priority 1 is available. At step S616, an electronic package may be transmitted to the user device. According to exemplary embodiments, the electronic package may include data related to the value of the security, data related to a calculated quality level, data related to an explainable trace of the rules used for generating the value of the security, and data related to explanation of the quality level, but the disclosure is not limited thereto.

According to exemplary embodiments, when it is determined at step S610 that priority 1 is not available, the process 600 proceeds to step S618 where it may be determined whether or not priority 2 is available. According to exemplary embodiments, when it is determined at step S618 that priority 2 is available, the process 600 proceeds to step S620 where priority 2 is selected for service request and reply, and the process 600 subsequently proceeds to steps S614 and S616 as described above.

According to exemplary embodiments, when it is determined at step S618 that priority 2 is not available, the process 600 proceeds to step S622 where it may be determined whether or not priority n is available. According to exemplary embodiments, when it is determined at step S622 that priority n is available, the process 600 proceeds to step S624 where priority n is selected for service request and reply, and the process 600 subsequently proceeds to step S614 and S616 as described above.

According to exemplary embodiments, when it is determined at step S622 that priority n is not available, the process 600 may proceed to S614 where instead of generating the value of security, a trace explanation may be generated explaining that none of the services are available and at step S616, an electronic package may be sent to the user device indicating that none of the services are available.

According to exemplary embodiments, in the process 600, establishing a communication link may further include: registering availability of each service with the registry; and maintaining the communication link between the registry and the plurality of service devices via corresponding heartbeat.

According to exemplary embodiments, the process 600 may further include: pre-configuring the registry with an indication of priority for each service; and maintaining a record within the registry corresponding to types of servicers and availability of each service.

According exemplary embodiments, the process 600 may further include: pre-configuring the registry with an indication of priority for each service and availability of each service; maintaining the communication link between the registry and the plurality of service devices via corresponding heartbeat; and updating the registry based on: (i) information received from a service device where the service device self-discloses that it is not reliable or not available to perform its service; or (ii) observation by the registry that there is no active heartbeat between a service device and the registry.

According to exemplary embodiments, in the process 600, the rules/logics may specify a priority among the properties of the services that corresponds to the requested priority level.

According to exemplary embodiments, the process 600 may further include: identifying a service, that is to be used for generating the value of the security based on the requested quality level, as a first order priority service in response to the received request; confirming whether or not the service identified as the first order priority service is available; and transmitting the received request to the first order priority service when it is confirmed that the service identified as the first order priority service is available.

According to exemplary embodiments, when it is confirmed that the service identified as the first order priority service is not available, the process 600 may further include: identifying another service, that is to be used for generating e value of the security based on the requested quality level, as a second order priority service in response to the received request; confirming whether or not the service identified as the second order priority service is available; and transmitting the received request to the second order priority service when it is confirmed that the service identified as the second order priority service is available.

According to exemplary embodiments, when all service options have expired and none are available, the process 600 may further include: constructing a quality of response message indicating appropriate error condition; and transmitting the message to the user device.

According to exemplary embodiments, a non-transitory computer readable medium may be configured to store instructions for implementing the SVGM 406, but the disclosure is not limited thereto. According to exemplary embodiments, the instructions, when executed, may cause a processor embedded within the SVGM 406 to perform the following: establishing a communication link between a registry and a plurality of service devices each configured to provide corresponding service; receiving a request from a user device for generating a value of a security based on a requested quality level; implementing rules to determine which service to be used for generating the value of the security based on the requested quality level in response to the received request; generating the value of the security based on the implemented rules; and transmitting an electronic package to the user device, the electronic package including data related to the value of the security. The processor may be the same or similar to the processor 104 as illustrated in FIG. 1 or the processor embedded within SVGD 202, SVGD 302, SVGM 306, SVGD 406, and SVGM 406.

According to exemplary embodiments, in establishing a communication link, the instructions, when executed, may further cause the processor 104 to perform the following: registering availability of each service with the registry; and maintaining the communication link between the registry and the plurality of service devices via corresponding heartbeat.

According to exemplary embodiments, the instructions, when executed, may further cause the processor 104 to perform the following: pre-configuring the registry with an indication of priority for each service; and maintaining a record within the registry corresponding to types of servicers and availability of each service.

According exemplary embodiments, the instructions, when executed, may further cause the processor 104 to perform the following: pre-configuring the registry with an indication of priority for each service and availability of each service; maintaining the communication link between the registry and the plurality of service devices via corresponding heartbeat; and updating the registry based on: (i) information received from a service device where the service device self-discloses that it is not reliable or not available to perform its service; or observation by the registry that there is no active heartbeat between a service device and the registry.

According to exemplary embodiments, the instructions, when executed, may further cause the processor 104 to cause the rules/logics to specify a priority among the properties of the services that corresponds to the requested priority level.

According to exemplary embodiments, the instructions, when executed, may further cause the processor 104 to perform the following: identifying a service, that is to be used for generating the value of the security based on the requested quality level, as a first order priority service in response to the received request; confirming whether or not the service identified as the first order priority service is available; and transmitting the received request to the first order priority service when it is confirmed that the service identified as the first order priority service is available.

According to exemplary embodiments, when it is confirmed that the service identified as the first order priority service is not available, the instructions, when executed, may further cause the processor 104 to perform the following: identifying another service, that is to be used for generating the value of the security based on the requested quality level, as a second order priority service in response to the received request; confirming whether or not the service identified as the second order priority service is available; and transmitting the received request to the second order priority service when it is confirmed that the service identified as the second order priority service is available.

According to exemplary embodiments, when all service options have expired and none are available, the instructions, when executed, may further cause the processor 104 to perform the following: constructing a quality of response message indicating appropriate error condition; and transmitting the message to the user device.

According to exemplary embodiments as disclosed above in FIGS. 1-6, technical improvements effected by the instant disclosure may include platforms for implementing a security value generation module for determining a value (e.g., a financial value, price, accrued interest, etc., but the disclosure is not limited thereto) of a security based on a requested quality, but the disclosure is not limited thereto. According to exemplary embodiments as disclosed above in FIGS. 1-6, technical improvements effected by the instant disclosure may further include platforms for implementing a security value generation module which may use rules and artificial intelligence (AI)/machine learning (ML) models to determine how to generate the value from different options, and returns the value, quality level, and traceable explanation, thereby improving functionality of an adaptive system in a trading environment, but the disclosure is not limited thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the ten "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for implementing a security value generation module by utilizing one or more processors and one or more memories, the method comprising:
    establishing a communication link between a registry and a plurality of service devices each configured to provide corresponding service;
    receiving a request from a user device for generating a value of a security based on a requested quality level;
    implementing rules to determine which service to be used for generating the value of the security based on the requested quality level in response to the received request;
    generating the value of the security based on the implemented rules; and
    transmitting an electronic package to the user device, the electronic package including data related to the value of the security.

2. The method according to claim 1, wherein the electronic package further includes data related to a calculated quality level, data related to an explainable trace of the rules used for generating the value of the security, and data related to explanation of the quality level.

3. The method according to claim 1, wherein establishing a communication link further comprises:
    registering availability of each service with the registry; and
    maintaining the communication link between the registry and the plurality of service devices via corresponding heartbeat.

4. The method according to claim 1, further comprising:
    pre-configuring the registry with an indication of priority for each service; and
    maintaining a record within the registry corresponding to types of servicers and availability of each service.

5. The method according to claim 1, further comprising:
    pre-configuring the registry with an indication of priority for each service and availability of each service;
    maintaining the communication link between the registry and the plurality of service devices via corresponding heartbeat; and
    updating the registry based on: (i) information received from a service device where the service device self-discloses that it is not reliable or not available to perform its service; or (ii) observation by the registry that there is no active heartbeat between a service device and the registry.

6. The method according to claim 1, wherein the rules specify a priority among the properties of the services that corresponds to the requested priority level.

7. The method according to claim 1, further comprising:
    identifying a service, that is to be used for generating the value of the security based on the requested quality level, as a first order priority service in response to the received request;
    confirming whether or not the service identified as the first order priority service is available; and
    transmitting the received request to the first order priority service when it is confirmed that the service identified as the first order priority service is available.

8. The method according to claim 7, wherein, when it is confirmed that the service identified as the first order priority service is not available, the method further comprising:
    identifying another service, that is to be used for generating the value of the security based on the requested quality level, as a second order priority service in response to the received request;
    confirming whether or not the service identified as the second order priority service is available; and
    transmitting the received request to the second order priority service when it is confirmed that the service identified as the second order priority service is available.

9. The method according to claim 8, wherein, when all service options have expired and none are available, the method further comprising:
    constructing a quality of response message indicating appropriate error condition; and
    transmitting the message to the user device.

10. A system for implementing a security value generation module, comprising:
    a registry including memories; and
    a processor operatively connected to the registry via a communication network, wherein the processor is configured to:
        establish a communication link between the registry and a plurality of service devices each configured to provide corresponding service;
        receive a request from a user device for generating a value of a security based on a requested quality level;

implement rules to determine which service to be used for generating the value of the security based on the requested quality level in response to the received request;

generate the value of the security based on the implemented rules; and transmit an electronic package to the user device, the electronic package including data related to the value of the security.

11. The system according to claim 10, wherein the electronic package further includes data related to a calculated quality level, data related to an explainable trace of the rules used for generating the value of the security, and data related to explanation of the quality level.

12. The system according to claim 10, wherein in establishing a communication link, the processor is further configured to:

register availability of each service with the registry; and maintain the communication link between the registry and the plurality of service devices via corresponding heartbeat.

13. The system according to claim 10, wherein the processor is further configured to:

pre-configure the registry with an indication of priority for each service; and maintain a record within the registry corresponding to types of servicers and availability of each service.

14. The system according to claim 10, wherein the processor is further configured to:

pre-configure the registry with an indication of priority for each service and availability of each service;

maintain the communication link between the registry and the plurality of service devices via corresponding heartbeat; and update the registry based on: (i) information received from a service device where the service device self-discloses that it is not reliable or not available to perform its service; or (ii) observation by the registry that there is no active heartbeat between a service device and the registry.

15. The system according to claim 10, wherein the rules specify a priority among the properties of the services that corresponds to the requested priority level.

16. The system according to claim 10, wherein the processor is further configured to:

identify a service, that is to be used for generating the value of the security based on the requested quality level, as a first order priority service in response to the received request;

confirm whether or not the service identified as the first order priority service is available; and transmit the received request to the first order priority service when it is confirmed that the service identified as the first order priority service is available.

17. The system according to claim 16, wherein, when it is configured that the service identified as the first order priority service is not available, the processor is further configured to:

identify another service, that is to be used for generating the value of the security based on the requested quality level, as a second order priority service in response to the received request;

confirm whether or not the service identified as the second order priority service is available; and transmit the received request to the second order priority service when it is confirmed that the service identified as the second order priority service is available.

18. The system according to claim 17, wherein, when all service options have expired and none are available, the processor is further configured to:

construct a quality of response message indicating appropriate error condition; and transmit the message to the user device.

19. A non-transitory computer readable medium configured to store instructions for implementing a security value generation module, wherein, when executed, the instructions cause a processor to perform the following:

establishing a communication link between a registry and a plurality of service devices each configured to provide corresponding service;

receiving a request from a user device for generating a value of a security based on a requested quality level;

implementing rules to determine which service to be used for generating the value of the security based on the requested quality level in response to the received request;

generating the value of the security based on the implemented rules; and transmitting a package to the user device, the package including data related to the value of the security.

20. The non-transitory computer readable medium according to claim 19, wherein the electronic package further includes data related to a calculated quality level, data related to an explainable trace of the rules used for generating the value of the security, and data related to explanation of the quality level.

* * * * *